(12) United States Patent
Shibagami

(10) Patent No.: US 9,060,158 B2
(45) Date of Patent: Jun. 16, 2015

(54) IMAGE PICKUP APPARATUS THAT CONTINUOUSLY TAKES IMAGES TO OBTAIN MULTIPLE IMAGES, CONTROL METHOD THEREFOR, AND STORAGE MEDIUM

(71) Applicant: CANON KABUSHIKI KAISHA, Tokyo (JP)

(72) Inventor: Genjiro Shibagami, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/099,235

(22) Filed: Dec. 6, 2013

(65) Prior Publication Data

US 2014/0098261 A1  Apr. 10, 2014

Related U.S. Application Data

(63) Continuation of application No. 13/209,489, filed on Aug. 15, 2011, now Pat. No. 8,625,000.

(30) Foreign Application Priority Data

Aug. 18, 2010  (JP) ................................. 2010-183297

(51) Int. Cl.
*G06K 9/62* (2006.01)
*H04N 5/76* (2006.01)
*H04N 1/21* (2006.01)
(Continued)

(52) U.S. Cl.
CPC ............... *H04N 5/76* (2013.01); *H04N 1/2112* (2013.01); *H04N 1/215* (2013.01); *H04N 2101/00* (2013.01); *H04N 5/23219* (2013.01)

(58) Field of Classification Search
CPC ............................. H04N 1/215; H04N 5/2356
USPC ................... 348/231.2, 333.11, 220.1, 229.1, 348/333.05, 333.12; 382/190, 209, 224
See application file for complete search history.

(56) References Cited

U.S. PATENT DOCUMENTS 7,456,874 B1  11/2008  Ono
8,199,213 B2   6/2012  Hattori et al.
(Continued)

FOREIGN PATENT DOCUMENTS

CN  101419666 A  4/2009
CN  101646019 A  2/2010
(Continued)

OTHER PUBLICATIONS

Japanese Office Action issued in JP 2010-183297, dated Feb. 18, 2014.
(Continued)

*Primary Examiner* — John Villecco
(74) *Attorney, Agent, or Firm* — Rossi, Kimms & McDowell LLP

(57) ABSTRACT

An image pickup apparatus capable of selecting an image more suited to a user from images that have been continuously taken. A face included in each of a plurality of images is chosen, and with respect to each of the images, an evaluation value for use in selecting one image from the plurality of images is calculated based on the face chosen in each of the images. An image with the highest evaluation value is selected, and when there are a plurality of images with the highest evaluation value, an image taken first is selected. The selected image is then recorded.

14 Claims, 12 Drawing Sheets

(51) Int. Cl.
*H04N 101/00* (2006.01)
*H04N 5/232* (2006.01)

(56) References Cited

U.S. PATENT DOCUMENTS

| | | | |
|---|---|---|---|
| 8,208,732 B2 | 6/2012 | Nakamura | |
| 8,254,639 B2 | 8/2012 | Tsujimura | |
| 8,289,400 B2 | 10/2012 | Brunner et al. | |
| 8,768,063 B2 * | 7/2014 | Sugita | 382/190 |
| 8,803,981 B2 * | 8/2014 | Brunner et al. | 348/208.1 |
| 2003/0193610 A1 | 10/2003 | Nozaki et al. | |
| 2006/0132623 A1 | 6/2006 | Nosaki et al. | |
| 2006/0215041 A1 | 9/2006 | Kobayashi | |
| 2006/0221223 A1 | 10/2006 | Terada | |
| 2007/0132874 A1 * | 6/2007 | Forman et al. | 348/333.02 |
| 2008/0122944 A1 | 5/2008 | Zhang | |
| 2008/0170761 A1 | 7/2008 | Teng et al. | |
| 2009/0087099 A1 | 4/2009 | Nakamura | |
| 2009/0324098 A1 | 12/2009 | Nilsson | |
| 2010/0020224 A1 * | 1/2010 | Hattori et al. | 348/333.11 |
| 2010/0033590 A1 | 2/2010 | Kawaguchi | |
| 2010/0039527 A1 | 2/2010 | Kretz et al. | |
| 2010/0149361 A1 | 6/2010 | Takeuchi | |
| 2010/0189356 A1 | 7/2010 | Sugita | |
| 2010/0245614 A1 * | 9/2010 | Matsunaga | 348/222.1 |
| 2011/0013038 A1 | 1/2011 | Kim et al. | |
| 2011/0181742 A1 | 7/2011 | Nozaki et al. | |
| 2011/0205383 A1 | 8/2011 | Shah | |
| 2011/0261219 A1 | 10/2011 | Suzuki et al. | |
| 2012/0236163 A1 * | 9/2012 | Teruya | 348/207.99 |
| 2012/0300092 A1 | 11/2012 | Kim et al. | |
| 2013/0208167 A1 * | 8/2013 | Chou et al. | 348/333.11 |

FOREIGN PATENT DOCUMENTS

| | | | |
|---|---|---|---|
| JP | 2000-209483 A | | 7/2000 |
| JP | 2006-5366 A | | 2/2006 |
| JP | 2006-53666 A | | 2/2006 |
| JP | 2006311340 A | * | 11/2006 |
| JP | 2007-049408 | | 2/2007 |
| JP | 2009-80529 A | | 4/2009 |
| JP | 2009-89077 A | | 4/2009 |
| JP | 2009-253848 A | | 10/2009 |
| JP | 2009-272740 A | | 11/2009 |
| JP | 2010-177894 A | | 8/2010 |
| JP | 2012-60292 A | | 3/2012 |

OTHER PUBLICATIONS

Notice on the First Office Action for corresponding CN 201110238051.4, dated Sep. 17, 2013.

* cited by examiner

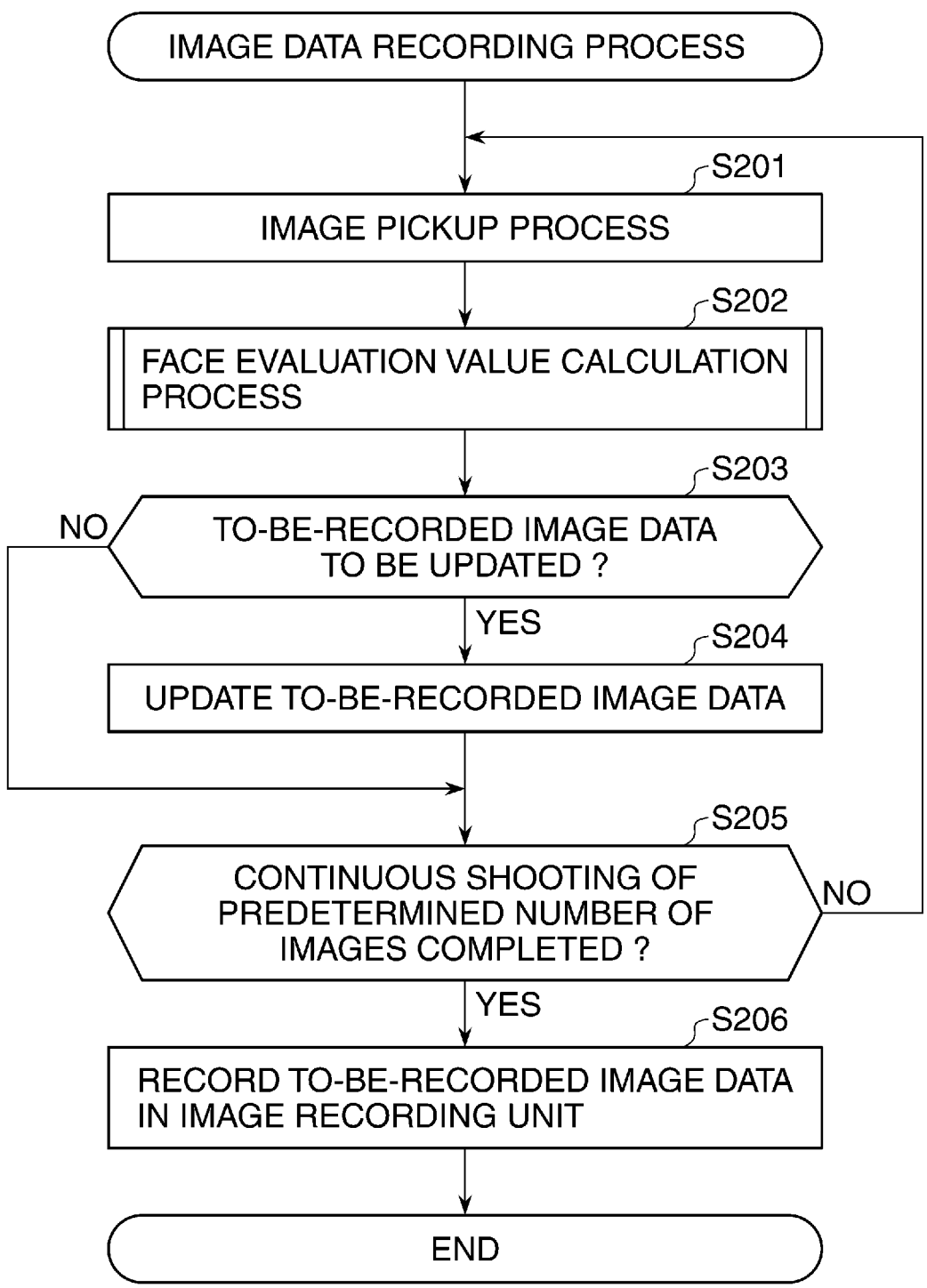

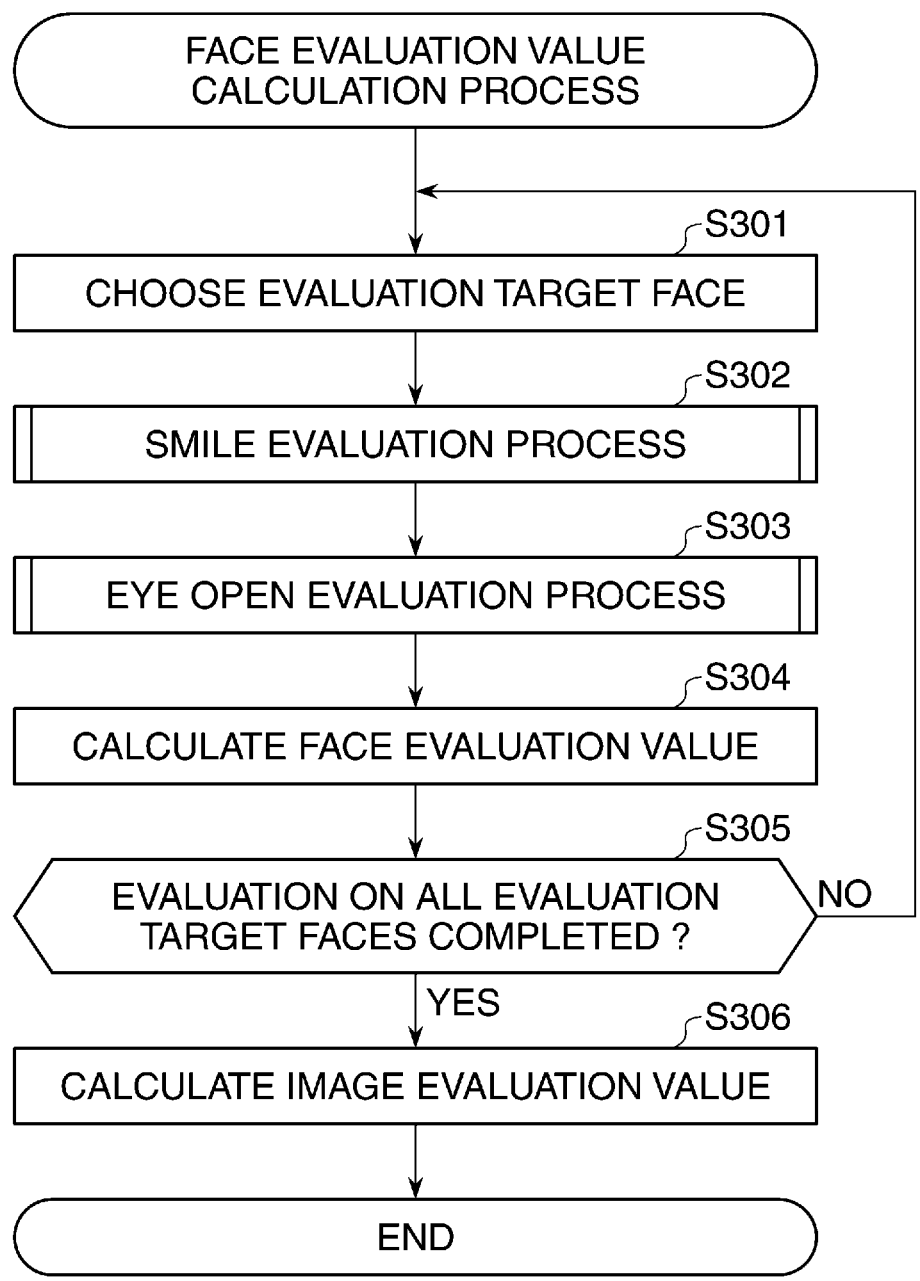

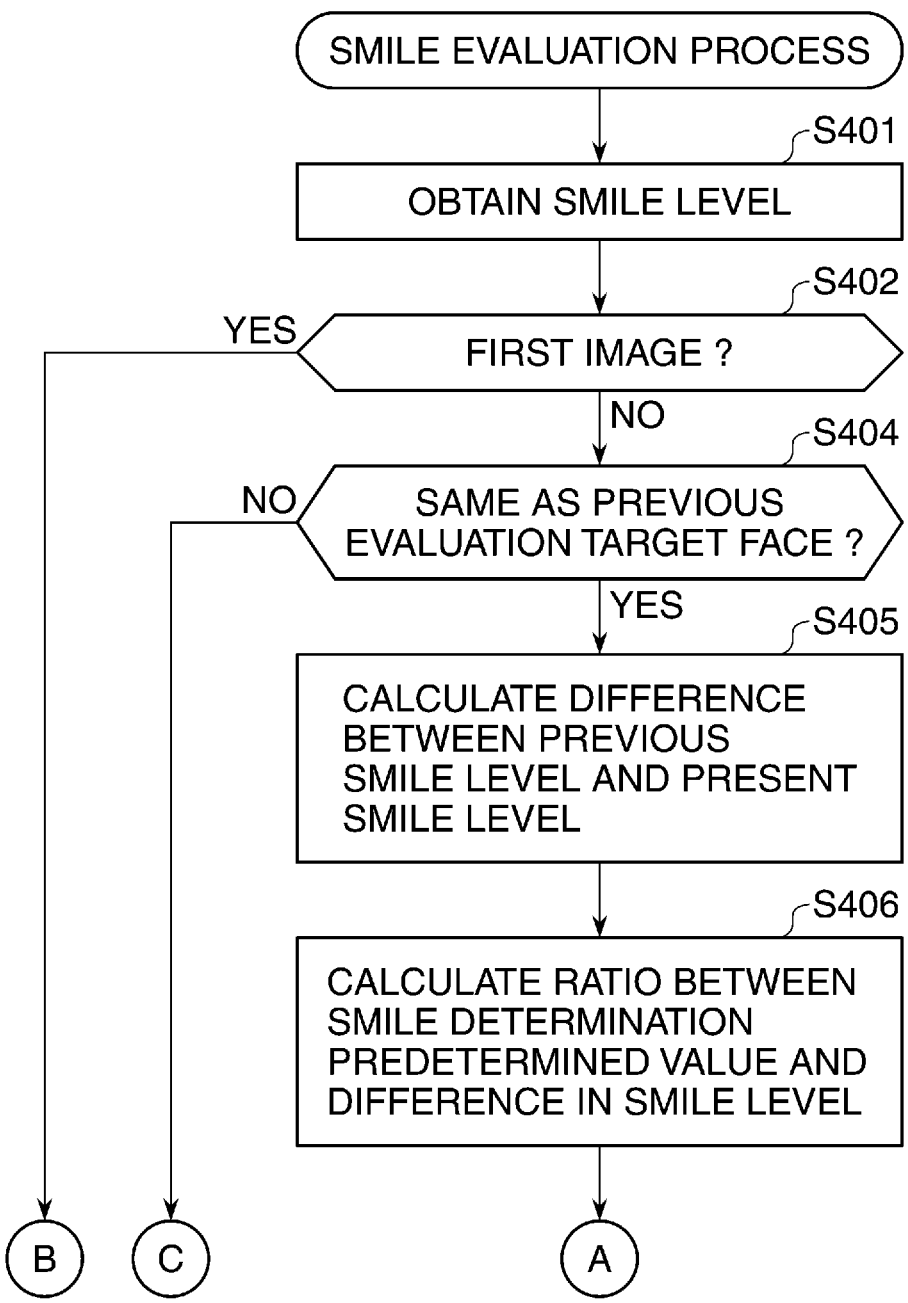

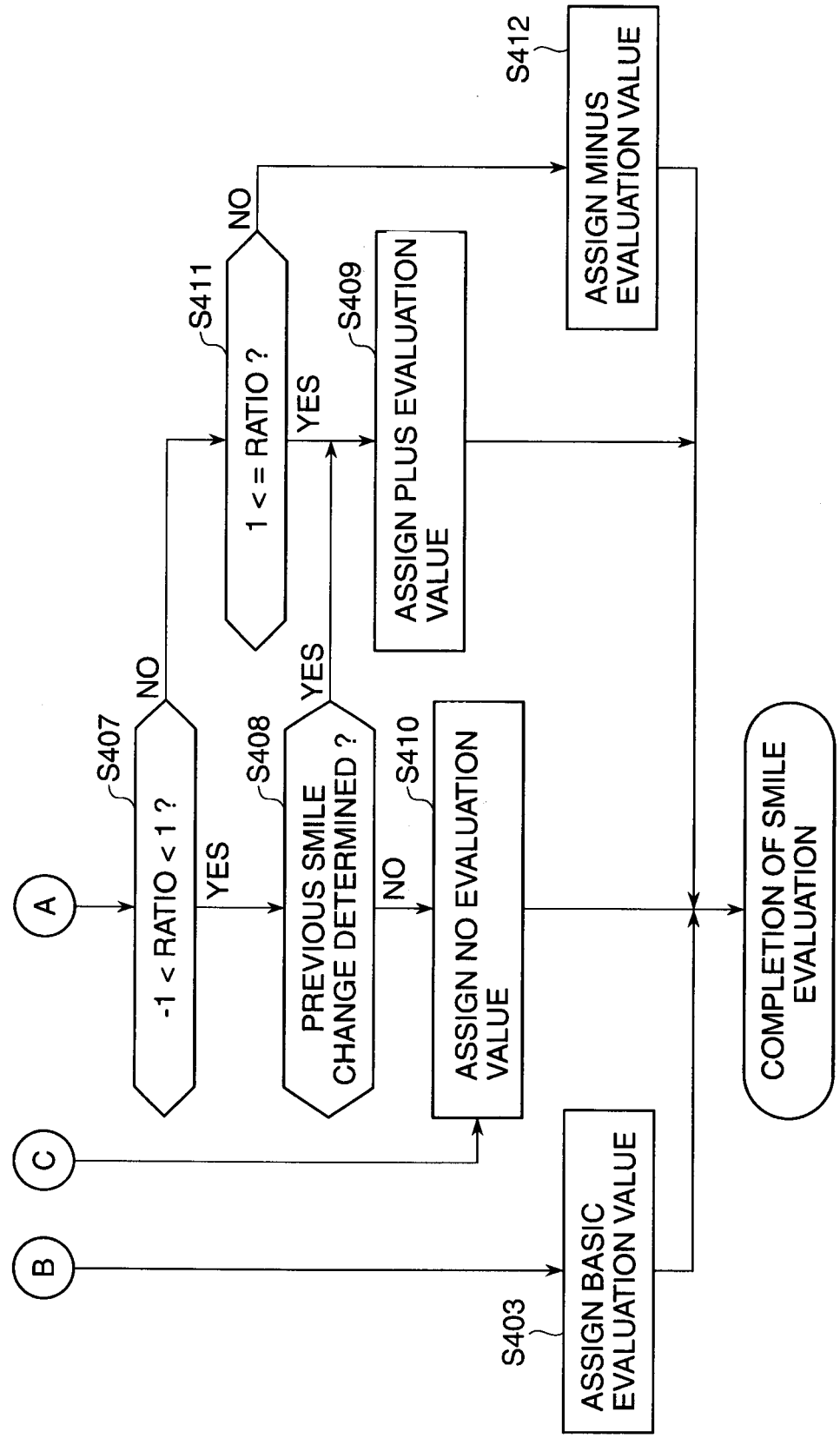

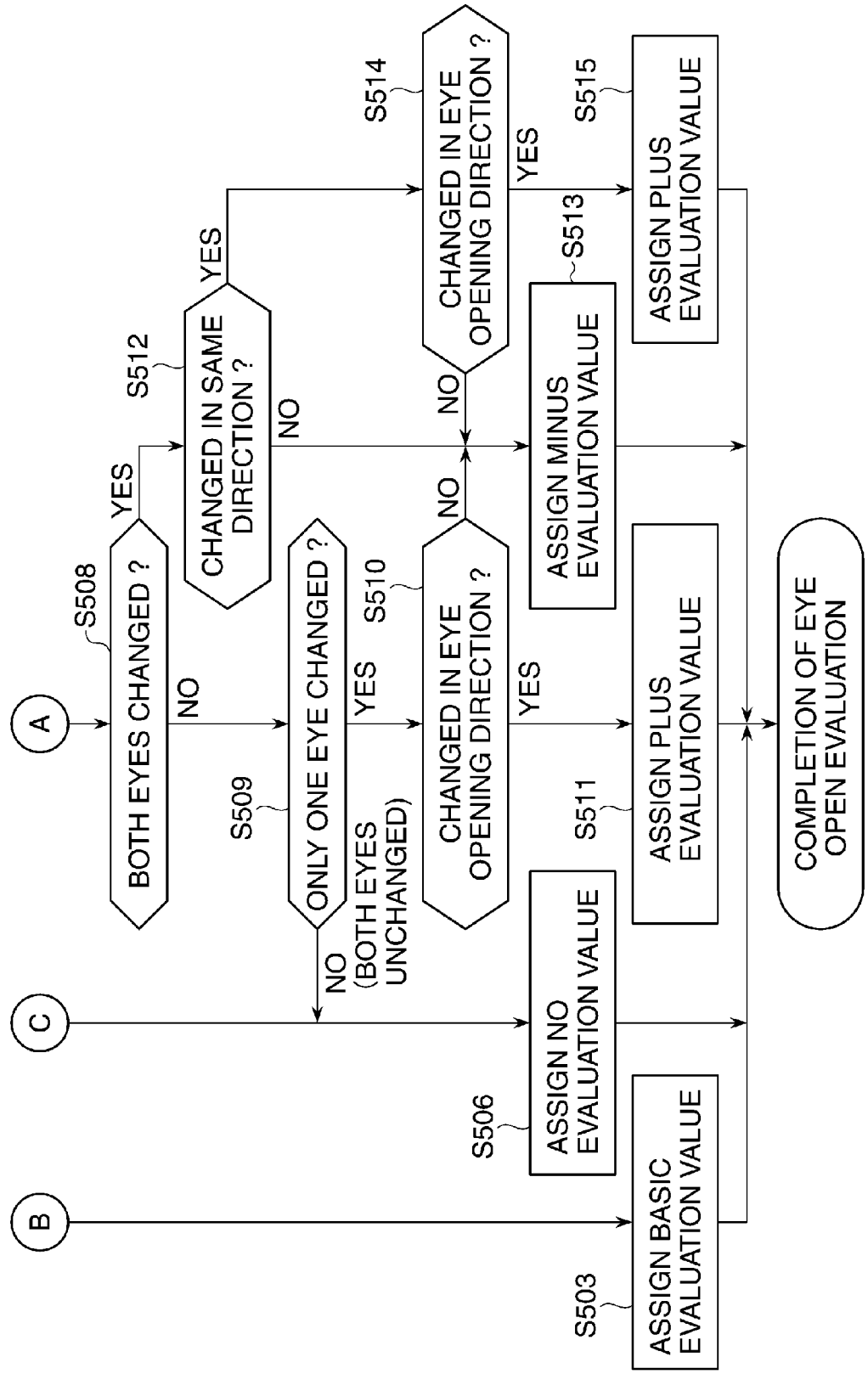

IMAGE PICKUP APPARATUS THAT CONTINUOUSLY TAKES IMAGES TO OBTAIN MULTIPLE IMAGES, CONTROL METHOD THEREFOR, AND STORAGE MEDIUM

BACKGROUND OF THE INVENTION

1. Field of the Invention

The present invention relates to an image pickup apparatus, a control method, and a storage medium, and more particularly to an image pickup apparatus that continuously takes images to obtain multiple images, a control method therefor, and a storage medium storing a program for implementing the method.

2. Description of the Related Art

Conventionally, image processing techniques that enable images having a face with an expression desired to be remained is obtained from among continuously-taken images.

For example, face images are detected from images, and facial expression evaluation values corresponding to respective facial expressions are calculated from the detected face images, and facial expressions are determined based on the relationship between the facial evaluation values and threshold values provided for the facial evaluation, values (see, for example, Japanese Laid-Open Patent Publication (Kokai) No. 2009-253848). Also, there has been proposed a method that an image pickup means is provided for continuously obtaining a plurality of images, and the images are ranked using at least one of the following conditions, a state of a main subject, image composition, and a state of human faces as a predetermined condition (see, for example, Japanese Laid-Open Patent Publication (Kokai) No. 2009-272740).

However, according to the invention described in Japanese Laid-Open Patent Publication (Kokai) No. 2009-253848, because threshold values are used for determination, facial expressions are determined in only second stages.

Also, the invention described in Japanese Laid-Open Patent Publication (Kokai) No. 2009-272740 has the problem that the start timing of image pickup which is information reflecting the intent of a user is not taken into consideration although states of main subjects are taken into consideration. Specifically, even when each of a plurality of images that have been continuously taken are evaluated, and a highest ranked image is selected, this does not always suit to a user. For example, even when an image taken immediately after a release button for starting image pickup is pressed by a user is given a lower evaluation than an image taken several images later, there is only a small difference between them. In this case, the difference does not raise a problem for the user, and it can be thought that an image taken near the time at which the release button is intentionally operated by the user is likely to suit the user.

Thus, the conventional arts have the problem that an image selected from continuously-taken images is not always an image suited to a user.

SUMMARY OF THE INVENTION

The present invention provides an image pickup apparatus capable of selecting an image more suited to a user can be selected from images that have been continuously taken, a control method for the image pickup apparatus, and a computer-readable storage medium storing a program for implementing the method.

Accordingly, a first aspect of the present invention provides an image pickup apparatus that continuously takes images of a subject to obtain a plurality of images representing the subject, comprising a choosing unit configured to choose a face included in each of the plurality of images, a calculation unit configured to calculate an evaluation value, which is used to select one image from the plurality of images, based on the face chosen in each of the plurality of images by the choosing unit, with respect to each of the plurality of images, a selection unit configured to select an image with the highest evaluation value calculated by the calculation unit, and when there are a plurality of images with the highest evaluation value calculated by the calculation unit, select an image taken first, and a recording unit configured to record the image selected by the selection unit.

Accordingly, a second aspect of the present invention provides a control method for an image pickup apparatus that continuously takes images of a subject to obtain a plurality of images representing the subject, comprising a choosing step of choosing a face included in each of the plurality of images, a calculation step of calculating an evaluation value, which is used to select one image from the plurality of images, based on the face chosen in each of the plurality of images in the choosing step, with respect to each of the plurality of images, a selection step of selecting an image with the highest evaluation value calculated in the calculation step, and when there are a plurality of images with the highest evaluation value calculated in the calculation step, selecting an image taken first, and a recording step of recording the image selected in the selection step.

Accordingly, a third aspect of the present invention provides a computer-readable non-transitory storage medium storing a program for causing a computer to implement a control method for an image pickup apparatus that continuously takes images of a subject to obtain a plurality of images representing the subject, the control method comprising a choosing step of choosing a face included in each of the plurality of images, a calculation step of calculating an evaluation value, which is used to select one image from the plurality of images, based on the face chosen in each of the plurality of images in the choosing step, with respect to each of the plurality of images, a selection step of selecting an image with the highest evaluation value calculated in the calculation step, and when there are a plurality of images with the highest evaluation value calculated in the calculation step, selecting an image taken first, and a recording step of recording the image selected in the selection step.

According to the present invention, an image more suited to the user can be selected from images that have been continuously taken.

Further features of the present invention will become apparent from the following description of exemplary embodiments (with reference to the attached drawings).

BRIEF DESCRIPTION OF THE DRAWINGS

FIG. 2 is a flowchart showing an image data recording process carried out by a system controller appearing in FIG. 1.

FIG. 3 is a flowchart showing the procedure of a face evaluation calculation process carried out in step S202 in FIG. 2.

FIGS. 4A and 4B are flowcharts showing the procedure of a smile evaluation process carried out in step S302 in FIG. 3.

FIGS. 5A and 5B are diagrams useful in explaining smile evaluation values assigned in the process in FIGS. 4A and 4B, in which FIG. 5A shows smile level, and FIG. 5B shows smile evaluation value.

FIGS. 6A and 6B are flowcharts showing the procedure of an eye open evaluation process carried out in step S303 in FIG. 3.

FIGS. 8A to 8C are diagrams useful in explaining an eye open evaluation value assigned in the process in FIGS. 6A and 6B, in which FIG. 8A shows eye open level in the right eye, FIG. 8B shows eye open level in the left eye, and FIG. 8C shows eye open evaluation value.

DESCRIPTION OF THE EMBODIMENTS

The present invention will now be described in detail with reference to the drawings showing an embodiment thereof.

Figure 1:
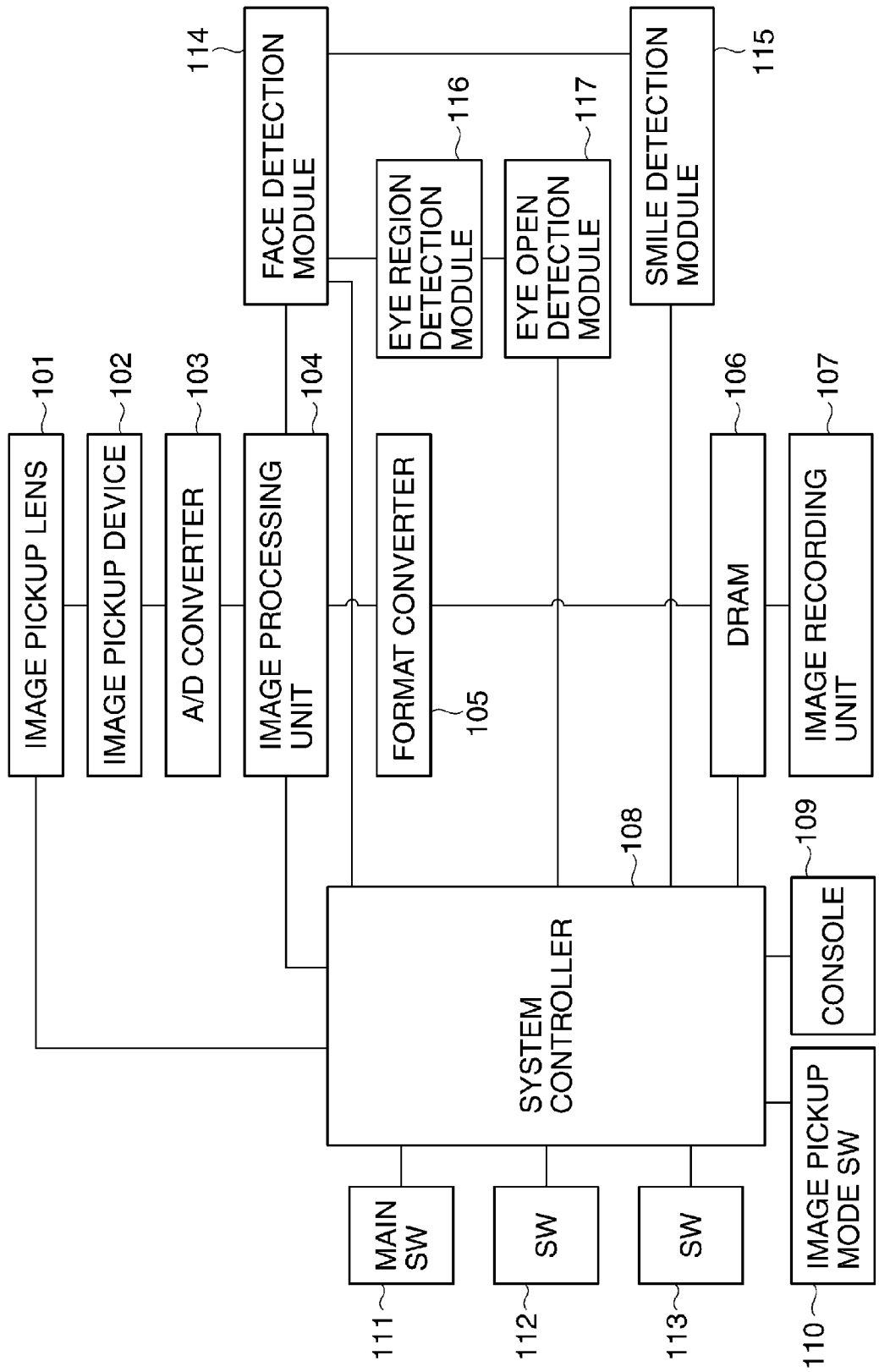
FIG. 1 is a block diagram schematically showing an exemplary arrangement of ah image pickup apparatus according to an embodiment of the present invention.

FIG. 1 is a block diagram schematically showing an arrangement of an image pickup apparatus according to an embodiment of the present invention.

Referring to FIG. 1, a digital camera 100 which is the image pickup apparatus according to the present embodiment includes a system controller 108, an image pickup lens 101, an image pickup device 102, an A/D converter 103, an image processing unit 104, and a format converter 105. The digital camera 100 further includes a DRAM 106, an image recording unit 107, and a face detection module 114. The digital camera 100 further includes a smile detection module 115, an eye region detection module 116, an eye open detection module 117, a console 109, an image pickup mode SW 110, a main SW 111, and SWs 112 and 113.

The system controller 108 controls the entire digital camera 100, and controls processes such as an image pickup sequence. The image pickup lens 101 includes a zoom mechanism, a focus lens mechanism, and a diaphragm shutter mechanism. The image pickup device 102 is a light-receiving means and a photoelectric conversion means for converting reflected light, from a subject into an electric signal. The A/D converter 103 includes a CDS circuit that, removes output noise from the image pickup device 102, and a nonlinear-amplification circuit that carries out nonlinear amplification before A/D conversion. The image processing unit 104 extracts signal components in a specific frequency band related to brightness from a signal output from the A/D converter 103, and detects a focusing state of the subject. The format converter 105 converts a signal output, from the image processing unit 104 into digital image data (hereafter referred to merely as an "image"). A DRAM 106 is a high-speed built-in memory (for example, a random access memory) in which an image output from the format converter 105 is recorded. The DRAM 106 is used as a high-speed buffer which is a temporary image storage means, or as a work memory for image compression and expansion. The image recording unit 107 includes a recording medium such as a memory card and its interface.

The console 109 is for a user to operate the digital camera 100. The console 109 includes a menu switch for configuring various settings of the digital camera 100 such as image pickup functions and image regeneration settings, a zoom lever for instructing the image pickup lens to perform a zooming operation, an operation mode switch for switching between an image pickup mode and a reproduction mode.

The image pickup mode SW 110 is a switch for configuring settings such as determination as to whether or not to carry out face detection. The main SW 111 is a switch for turning on the power to the digital camera 100. The SW 112 is a switch for taking image pickup standby actions such as AF (auto focus) and AE (auto exposure). The SW 113 is an image pickup switch for taking images after the SW 112 is operated. The SW 112 and the SW 113 are usually comprised of one button, and when the button is pressed halfway down, the SW 112 is turned on, and when the button is further pressed all the way down, the SW 113 is turned on.

The face detection module 114 carries out face detection using an image signal processed by the image processing unit 104, and sends detected one or more pieces of face information (for example, position, size, and reliability) to the system controller 108. The face detection module 114 carries out a well-known face detection process on an image output from the image processing unit 104, and detects a face region of a person included in an image taken by the image pickup device 102. It should be noted that examples of the well-known face detection process include a method that a skin tone region is extracted from tone colors of respective pixels of an image, and a face is detected based on the degree of matching with a face contour plate prepared in advance. Moreover, there has been disclosed a method that a face is detected by extracting feature points of a face such as eyes, nose, and mouth using a known pattern recognition technique.

The smile detection module 115 calculates a face smile level for the face detected by the face detection module 114. Specifically, the smile detection module 115 obtains feature amounts required to calculate the degree of smiling such as contours of face constituents which constitute a face and include eyes, nose and mouth, and positions of the face constituents such as inner corners of eyes, outer corners of eyes, nostrils, corner of mouth, and lip. Examples of the method to obtain feature amounts include a method using template matching based on templates of respective face constituents, and a method using a determination unit for each face constituent obtained by machine learning using a number of sample images of face constituents. The smile detection module 115 calculates a smile level indicative of the degree to which a face smiles based on the above described feature amounts.

The eye region detection module 116 detects an eye region from the face region detected by the face detection module 114.

The eye open detection module 117 detects the area of a brightness region corresponding to a black eye from a histogram in the eye region detected by the eye region detection module 116. Then, the eye open detection module 117 calculates an eye open level, which is indicative of the degree to which the eyes open, according to the area of a region corresponding to a black eye relative to an eye region.

It should be noted that methods for face detection, smile level calculation, and eye open level calculation are not limited to those described above, but various well-known methods may be used.

With the arrangement described above, in the present embodiment, when the user operates the SW 113, the system controller 108 starts continuously taking images. Then, system controller 108 records the obtained images on the DRAM 106, selects one with the highest evaluation value, to be described later, from among them, and records the selected image in the image recording unit 107 which is a nonvolatile memory. It should be noted that when there are a plurality of pieces of image data with the highest evaluation value, an image taken at a time closest to the time at which the SW 113 was operated, that is, an image obtained first is selected from the plurality of pieces of image data. It should be noted that, in the following description, continuously taking images may be referred to as "continuous shooting".

FIG. 2 is a flowchart showing an image data recording process carried out by the system controller 108 appearing in FIG. 1.

The image data recording process is a process in which a plurality of images indicative of a subject are obtained by continuously shooting the subject in response to the SW 113 being turned on, and an image selected from the obtained plurality of images is recorded in the image recording unit 107.

Referring to FIG. 2, the system controller 108 carries out an image pickup process in which it reads out an electric charge signal from the image pickup device 102, and writes taken images on a predetermined area of the DRAM 106 via the A/D converter 103, the image processing unit 104, and the format converter 105 (step S201). The system controller 108 carries out a face evaluation calculation process in FIG. 3, to be described later, to evaluate the taken images (step S202). Then, the system controller 108 determines whether or not to update an image to be recorded on the image recording unit 107 (hereafter referred to as "to-be-recorded image data"), that is, whether or not to select this image (step S203) (selection unit). When it is determined in the step S203 that the to-be-recorded image data is not to be updated (NO in the step S203), the process proceeds to step S205 with the step S204 skipped. On the other hand, when it is determined in the step S203 that the to-be-recorded image data is to be updated (YES in the step S203), the to-be-recorded image data is updated to the images subjected to the evaluation in the step S202 (step S204). Then, the system controller 108 determines whether or not a predetermined number of images have been continuously taken (step S205). When it is determined that the predetermined number of images have been continuously taken (YES in the step S205), the system controller 108 causes the image recording unit 107 to record the to-be-recorded image data recorded on the DRAM 106 (step S206) (recording unit), and terminates the process.

On the other hand, when it is determined in the step S203 that the to-be-recorded image data is not to be updated (NO in the step S203), the system controller 108 proceeds the process to the step S205. When it is determined in the step S205 that the predetermined number of images have not been continuously taken (NO in the S205), the system controller 108 repeatedly executes the step S201 and the subsequent steps.

A description will now be given of how it is determined in the step S203 whether or not to update the to-be-recorded image data. One of conditions for update is the condition A that image data subjected to determination is "the first image taken in sequential shooting". The other one of the conditions for update is the condition B that "no minus evaluation value is assigned to all the faces subjected to the evaluation, and any of the faces subjected to the evaluation has a plus evaluation value for face and has a greater face evaluation value than all other evaluation values". When either one of the conditions A and B is satisfied, the to-be-recorded image data is updated. In the following description, an evaluation value for a face may be referred to as "face evaluation value".

When the face evaluation values are the same, this means that not "greater than any other evaluation values", and hence the to-be-recorded image data is not updated, and an image close to the time at which image pickup is started is selected even when the face evaluation values are the same.

According to the process in FIG. 2, when there are a plurality of images with the highest evaluation value, an image taken first is selected (YES in the step S203). As a result, the image that is temporary closest the time at which image pickup is started is selected, so that the image more suited to the user can be selected.

A minus evaluation value means an evaluation value that is assigned to a face when the degree to which a face subjected to evaluation (hereafter referred to as "evaluation target face") smiles lowers a predetermined amount or more, and further, when the degree to which the eyes open lowers a predetermined amount or more. A minus evaluation value is assigned when the evaluation target face changes from a smiling face to a normal face, and when the evaluation target face changes from an eye opening state to an eye closing state.

A plus evaluation value means an evaluation value that is assigned to a face basically when the degree to which an evaluation target face smiles rises a predetermined amount or more, and further, when the degree to which the eyes open rises a predetermined amount or more. A plus evaluation value is assigned when an evaluation target face changes from a normal face to a smiling face, and when an evaluation target face changes from an eye opening state to an eye closing state.

The above-mentioned evaluation target face is a face for which a smile level and an eye open level are calculated to calculate an evaluation value among faces detected from an image. The evaluation target face is determined from "a face being present within a predetermined range of an image", "a face with a predetermined size or larger size", "a face focused at the start of image pickup", and so on. Namely, the evaluation target face is the face or faces of one or a plurality of persons intended as a subject by the user. From the second and subsequent images taken by continuous shooting, the same face as a face targeted for evaluation in the previous image pickup is preferentially adopted as an evaluation target face.

Whether or not the faces are the same may be determined using a face recognition technique, or when the present evaluation target face is substantially the same in size and position as an evaluation target face in the previous image pickup, it may be determined that the present evaluation target, face is the same face as an evaluation target face in the previous image pickup.

FIG. 3 is a flowchart showing the procedure of the face evaluation calculation process carried out in the step S202 in FIG. 2.

Referring to FIG. 3, the system controller 108 detects faces from an image, and chooses evaluation target, faces from the detected faces using the evaluation target face choosing method described above (step S301) (selection unit). The system controller 108 carries out a smile evaluation process in FIGS. 4A and 4B, to be described later, to do smile evaluation on any evaluation target face (step S302). The system controller 108 carries out an eye open evaluation process in FIG. 6, to be described later, to do a eye open evaluation on the same evaluation target face as the face on which the smile evaluation has been carried out (step S303). The system controller 108 then calculates a face evaluation value of the evaluation target face (step S304). In the present embodiment, the face evaluation value is calculated by adding up all the smile evaluation values and eye open evaluation values assigned to each evaluation target face.

The system controller 108 then determines whether or not evaluations on all the evaluation target faces within the image have been completed (step S305). Upon determining that evaluations on all the evaluation target faces within the image have not been completed (NO in the step S305), the system controller 108 repeatedly carries out the processes in the step S302 and the subsequent steps on the other evaluation target faces within the image. On the other hand, upon determining that evaluations on all the evaluation target faces within the image have been completed (YES in the step S305), the system controller 106 calculates image evaluation values (evaluation values) based on the faces selected from the respective images in the step S301 (step S306) (calculation unit), and terminates the present process. The evaluation values are used to select one image from the plurality of images that have been taken.

In the present embodiment, a face evaluation value is calculated by adding up all the evaluation values assigned to respective ones of a plurality of evaluation target faces in an image. Of course, when there is only one evaluation target face, a face evaluation value of this evaluation target face is an image evaluation value. When the number of persons is desired to be evaluated, an image evaluation value can be obtained by adding up face evaluation values of a plurality of evaluation target faces, and when the number of persons is not desired to be evaluated, an image evaluation value can be obtained by averaging face evaluation values of a plurality of evaluation target faces.

FIGS. 4A and 4B are flowcharts showing the procedure of the smile evaluation process carried out in the step S302 in FIG. 3.

Referring to FIGS. 4A and 4B, the system controller 108 obtains a smile level indicative of the degree of smiling with respect to an evaluation target face using the smile detection module 115 (step S401). The systems controller 108 determines whether or not the present image is the first one of images that have been continuously taken (step S402). When it is determined that the present image is the first image (YES in the step S402), the system controller 108 assigns a basic evaluation value to it (step S403), and terminates the present process. On the other hand, when it is determined that the present image is not the first image (NO in the step S402), the system controller 108 determines whether or not the present evaluation target face is the same as the previous evaluation target face, that is, whether or not the present evaluation target face is the same face as an evaluation target face in the previous image pickup (step S404). When it is determined that the faces are not the same (NO in the step S404), the system controller 108 terminates the present process without assigning any evaluation value (step 410). The reason why it is determined in the step S404 whether or not the faces are the same is that the persons have to be the same so as to use a smile determination predetermined value because it varies among different individuals.

On the other hand, when it is determined that the faces are the same (YES the step S404), the system controller 108 calculates a difference in smile level between the present image pickup and the previous image pickup (step S405). In the present embodiment, the smile level of an image targeted for comparison is compared to that in an image that has been previously taken, so that a change in facial expression is detected. On this occasion, the smile level of the target image may be compared to that in an image taken a predetermined time period ago, or may be compared to that in a taken image to be recorded. Thus, smile levels indicative of smiling degrees are obtained with respect to the same face in respective images.

Then, the system controller 108 then calculates the ratio between the difference and a smile determination predetermined value (first predetermined value) for evaluating a change in facial expression (step S406). The system controller 108 determines whether or not the ratio is smaller than 1 and greater than −1 (that is, whether or not the absolute value of the ratio is smaller than 1) (step S407). When it is determined that the absolute value of the ratio is smaller than 1 (YES in the step S407), the system controller 108 determines whether or not the evaluation target face has changed to a smile in the previous image for the first time (that is, whether or not the calculated ratio has become positive). When it is determined that the evaluation target face has not changed to a smile for the first time (MO in the step S408), the system controller 108 terminates the present process without assigning any evaluation value (step S410).

On the other hand, when it is determined in the step S407 that the absolute value of the ratio is not smaller than 1 (NO in the step S407), the system controller 108 determines whether or not the ratio is equal to or greater than 1 (step S411). When it is determined that the ratio is not equal to or greater than 1 (that is, the ratio is equal to or smaller than −1) (NO in the step S411), the system controller 108 assigns a minus evaluation value (step S412) and terminates the present process. The minus evaluation value assigned in the step S412 may be assigned according to the ratio obtained in the step S406. In this case, the larger the degree of change to a normal face, the greater in a minus direction an evaluation value to be assigned.

On the other hand, when it is determined in the step S408 that the evaluation target face has changed to a smile for the first time (YES in the step S408), the system controller 108 assigns a plus evaluation value (step S409) and terminates the present process. The plus evaluation value assigned in this step S409 after the step S406 is a uniform value.

When it is determined that the ratio is equal to or greater than 1 (YES in the step S411), the system controller 108 assigns a plus evaluation value (step S409) and terminates the present process. The plus evaluation value assigned in this step S409 after the step S411 may be assigned according to the ratio obtained in the step S406. In this case, the larger the degree of change to a smile, the greater in a plus direction an evaluation value to be assigned.

When in the process in FIG. 4B, it is determined that the evaluation target face has changed to a smile for the first, time with respect to the previous image (YES in the step S407 and YES in the step S408), the system controller 108 assigns a plus evaluation value only once even when the degree of the change is small. In an image in which a facial expression has just changed to a state determined as being a smile, the facial expression is likely to have reached a satisfactory smile level. Thus, by assigning a plus evaluation value only once even when the degree of smiling has not changed the smile determination predetermined value or more (step S409), a next, image that has changed is likely to be selected.

Figure 5A:
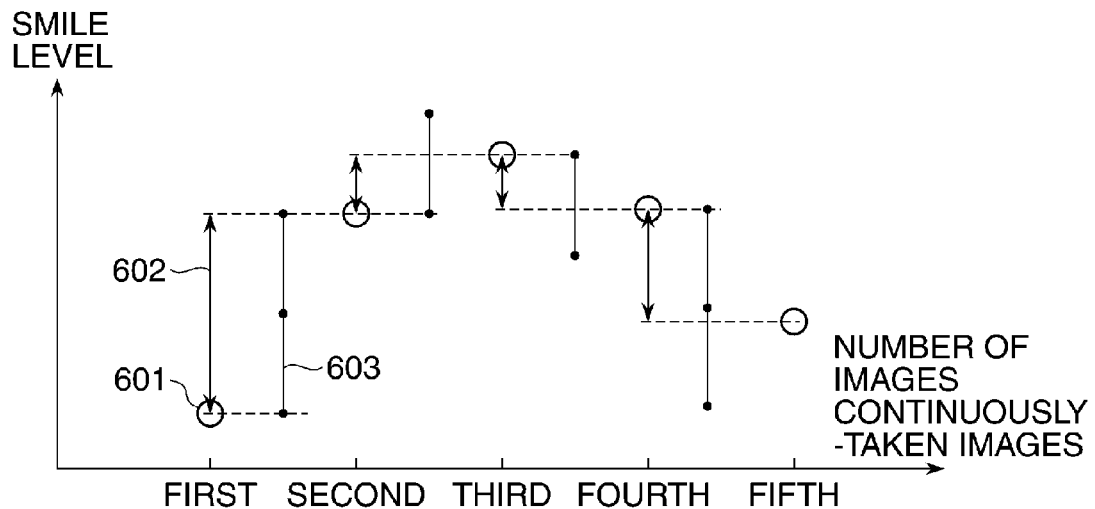
Figure 5B:
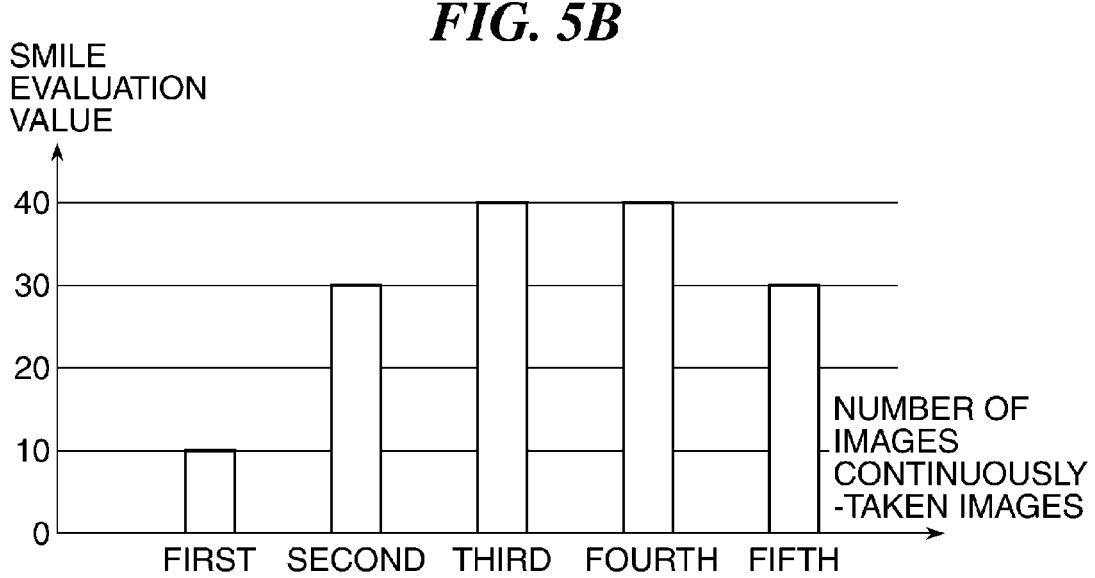

FIGS. 5A and 5B are diagrams useful in explaining smile evaluation values assigned in the process in FIGS. 4A and 4B, in which FIG. 5A shows smile level, and FIG. 5B shows smile evaluation value.

In the graph of FIG. 5A, the vertical axis represents smile level, and the horizontal axis represents the number of images that are continuously taken. In this graph, a white circle 601 indicates smile level in the first image. A difference 602 is a difference between smile level in the first image and a smile level in the second image. A line segment 603 is for comparing a smile determination predetermined value and a difference with each other, and the smile determination predetermined value is a segment between the nearest black circles. The white circle 601, the difference 602, and the line segment 603 are used in the same sense with respect to images other than the first one.

Particularly in FIG. 5A, as indicated by the line segment 603, a difference between the first, image and the second image is twice the smile determination predetermined value, and in this case, the ratio is "+2".

A difference between the second image and the third image and a difference between the third image and the fourth image are smaller than the smile determination predetermined value, and a difference between the fourth image and the fifth image is a little greater than the smile determination predetermined value.

On the other hand, in the graph of FIG. 5B, the vertical axis represents smile evaluation value, and the horizontal axis represents the number of images that are continuously taken.

Referring to the graph of FIG. 5B, because there is no image prior to the first image, no difference in smile level can be calculated, and hence the above described basic evaluation value such as "10" is assigned. Then, when the first image and the second image shown in FIG. 5A are compared in smile level with each other, a difference between them is a plus value greater than the smile determination predetermined value.

Because the ratio between the difference and the smile determination predetermined value is "+2" as described above, the system controller 103 assigns an evaluation value of "+20", and thus the total evaluation value is "30". When the second image and the third image are compared in smile level with each other, a difference between them is smaller than the smile determination predetermined value, and the system controller 108 thus determines that the face has not changed to a smile. However, when it is determined that the face has changed to a smile for the first time in the previous image, and facial expression has not changed, the system controller 108 assigns a uniform evaluation value only once. Here, the system controller 108 assigns an evaluation value of "+10", and thus the total evaluation value is "40".

Next, when the third image and the fourth image are compared in smile level with each other, a difference between them is smaller than the smile determination predetermined value, and the system controller 108 thus determines that the face has not changed to a smile. As a result, no evaluation is assigned, and hence the total evaluation value is still "40". Then, when the fourth image and the fifth image are compared in smile level with each other, a difference between them is a minus value greater than the smile determination predetermined value. Because the ratio between the difference and the smile determination predetermined value is not less than 1 and less than 2, an evaluation value of "−10" is assigned, and thus the total evaluation value is "30".

Figure 6A:
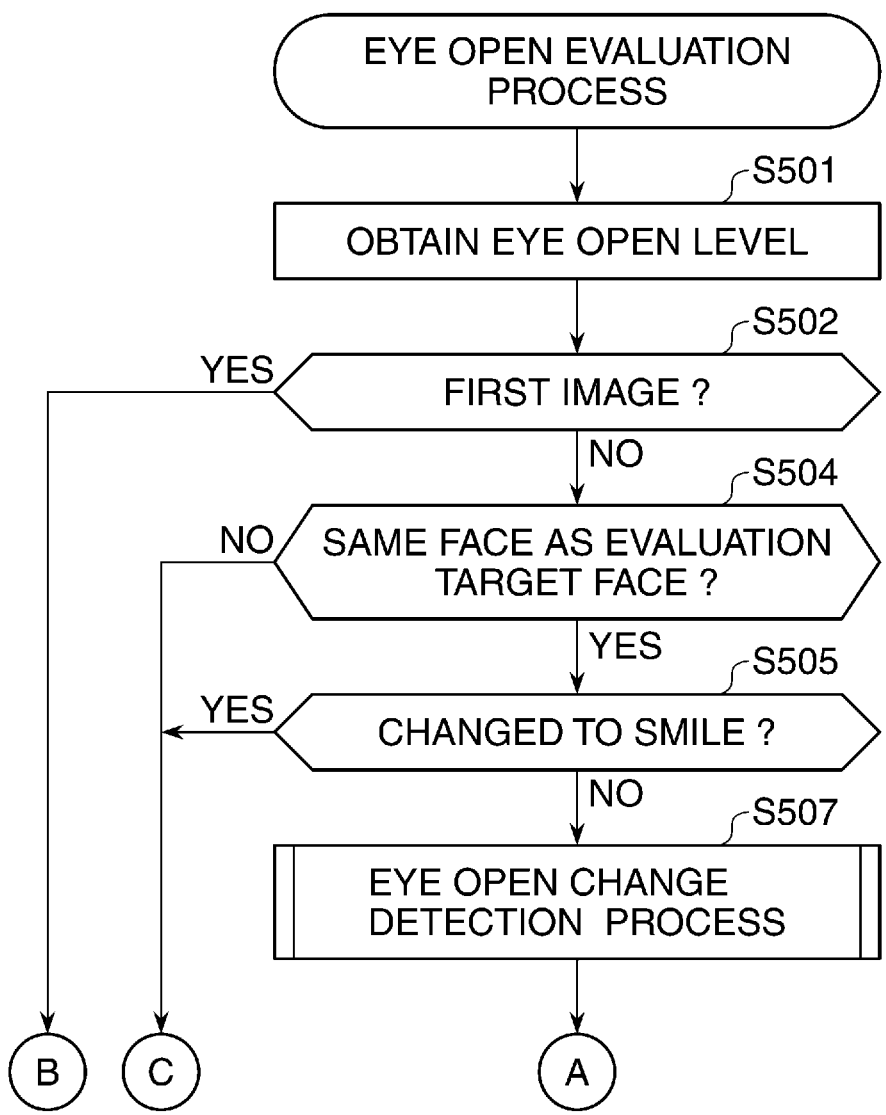

FIGS. 6A and 6B are flowcharts showing the procedure of the eye open evaluation process carried out in the step S303 in FIG. 3.

Referring to FIGS. 6A and 6B, with respect to an evaluation target face, the system controller 108 causes the eye open detection module 117 to obtain an eye open level indicative of the degree to which the eyes open (step S501). The system controller 108 determines whether or not the present evaluated image is the first one of images that are continuously taken (step S502). Upon determining that the present evaluated image is the first one of images that are continuously taken (YES in the step S502), the system controller 108 assigns the basic evaluation value (step S503) and terminates the present process. On the other hand, upon determining that, the present evaluated image is not the first one of images that are continuously taken (NO in the step S502), the system controller 108 determines whether or not the present evaluation target face is the same as an evaluation target face in the previous image pickup (step S504). The reason why it is determined whether or not the faces are the same is that the persons have to foe the same so as to use an eye open change determination predetermined value (second predetermined value) for evaluating changes in the degree to which the eyes open because it varies among different individuals. Thus, eye open levels indicative of the degrees to which the eyes open are obtained with respect to the same faces in the respective images.

The eye open change determination predetermined value may be prepared in advance as a predetermined value, or calculated from a measurement value obtained by measuring transitions in the eye open level of each eye of evaluation target faces obtained before the start of image pickup. Also, the eye open change determination predetermined value may be different between right, and left eyes.

When it is determined in the step S504 that the present evaluation target face is the same as an evaluation target face in the previous image pickup (YES in the step S504), the system controller 108 determines whether or not the face has changed to a smile (step S505).

On the other hand, when it is determined in the step S504 that the present evaluation target face is not the same as an evaluation target face in the previous image pickup (NO in the step S504), the system controller 108 terminates the present process without assigning any evaluation value (step S506). The reason why no evaluation value is assigned when the face has changed to a smile is that the face having changed to a smile is likely to close the eyes.

When it is determined in the step S504 that the face has not changed to a smile (NO in the step S505), the system controller 108 carries out an eye open change detection process in FIGS. 7A and 7B, to be described later (step S507). The eye open change detection process is a process in which a change in eye open is detected by calculating a difference in the eye open level of each eye between the present, image pickup and the previous image pickup. Regarding the previous image pickup subjected to comparison in the step S507, the system controller 108 compares eye open levels between an image in the present image pickup and an image the previous image pickup to detect a change in facial expression. On this occasion, the eye open level of an image in the present image pickup may be compared to the eye open level of an image taken a predetermined time ago, or may be compared to the eye open level of a taken image which is an image to be recorded.

Then, the system controller 108 determines whether or not the eye open levels of both eyes have changed (step S508). When, it is determined that the eye open levels of both eyes have changed (YES in the step S508), the system controller 108 determines whether or not both eyes have changed in the same direction (step S512). When it is determined that both eyes have changed in the same direction (YES in the step S512), the system controller 108 determines whether or not both eyes have changed in an eye opening direction (step S514). When it is determined that both eyes have changed in an eye opening direction (YES in the step S514), the system controller 108 assigns a plus evaluation value (step S515) and terminates the present process. The plus evaluation value assigned here is a value according to the ratio of an eye whose ratio between the difference and the eye open change determination predetermined value is higher.

When it is determined in the step S508 that the eye open levels of both eyes have not changed (MO in the step S508), the system controller 108 determines whether or not the eye open level of only one eye has changed (step S509). When it is determined that the eye open level of only one eye has not changed, that is, the eye open level of neither of the eyes has changed (NO in the step S509), the system controller 108 terminates the present process without assigning any evaluation value (step S506).

When it is determined that the eye open level of only one eye has changed (YES in the step S509), the system controller 108 determines whether or not the eye has change in an eye opening direction (step S510). When it is determined that the eye has changed in an eye opening direction (YES in the step S510), the system controller 108 assigns a plus evaluation value (step S511) and terminates the present process.

When it is determined in the step S510 that the eye has not changed in an eye opening direction (NO in the step S510), the system controller 108 assigns a minus evaluation value (step S513) and terminates the present process. When it is determined in the step S512 that, both eyes have not changed in the same direction (NO in the step S512), the system controller 108 assigns a minus evaluation value (step S513) and terminates the present process. When it is determined that the eyes have not changed in an eye opening direction (NO in the step S514), the system controller 108 assigns a minus evaluation value (step S513) and terminates the present process.

The minus evaluation value assigned in the step S513 is a value according to the ratio of an eye whose ratio between the difference and the eye open change determination predetermined value is higher.

The reason why a minus evaluation value is assigned when it is determined in the step S512 that the eyes have not changed in the same direction is that when the facial expression is likely to be unbalanced because one eye has changed in an eye opening direction, and the other eye has changed in an eye closing direction.

Figure 7A:
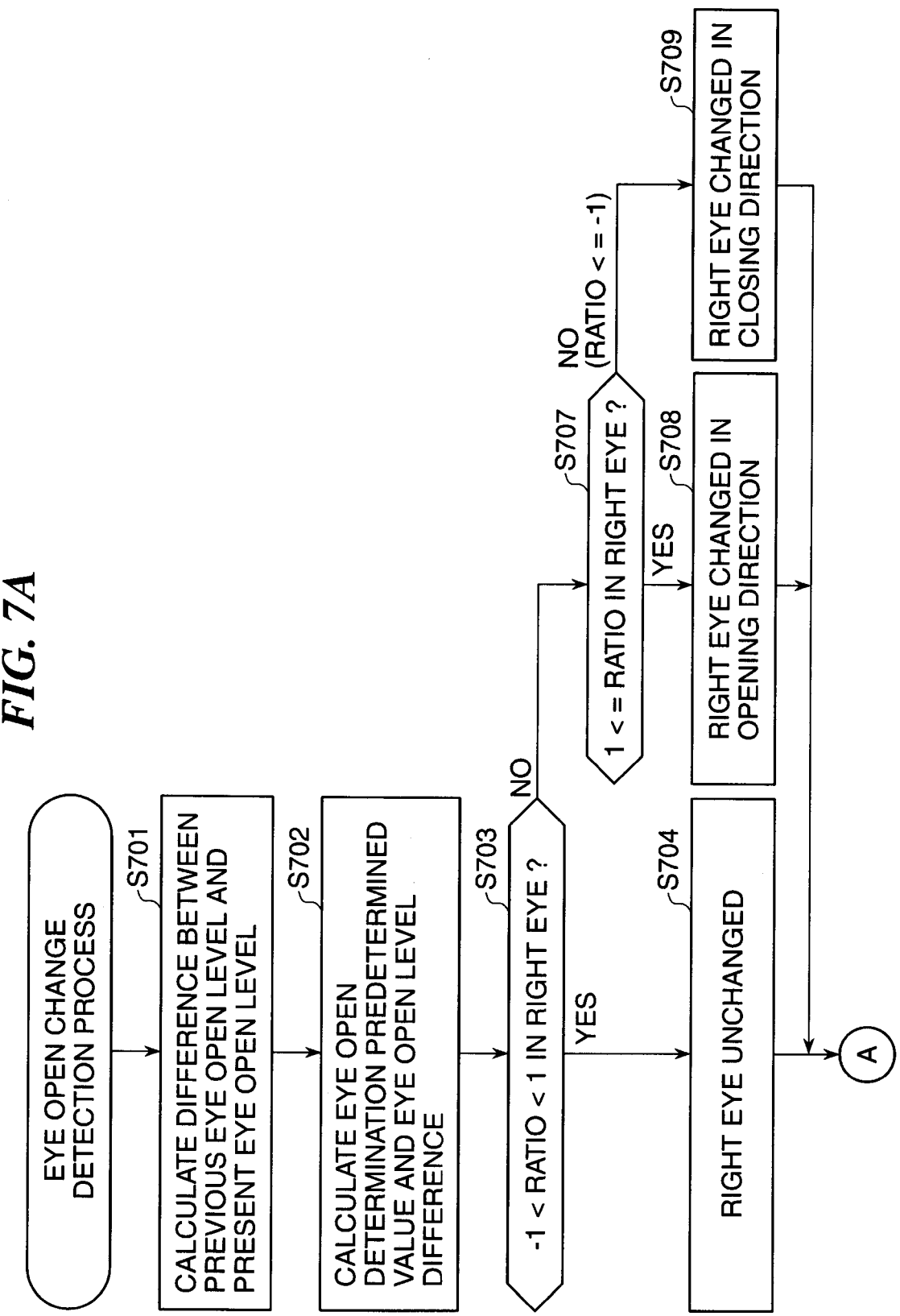
FIGS. 7A and 7B are flowcharts showing the procedure of an eye open change detection process carried out in step S507 in FIG. 6A.
Figure 7B:
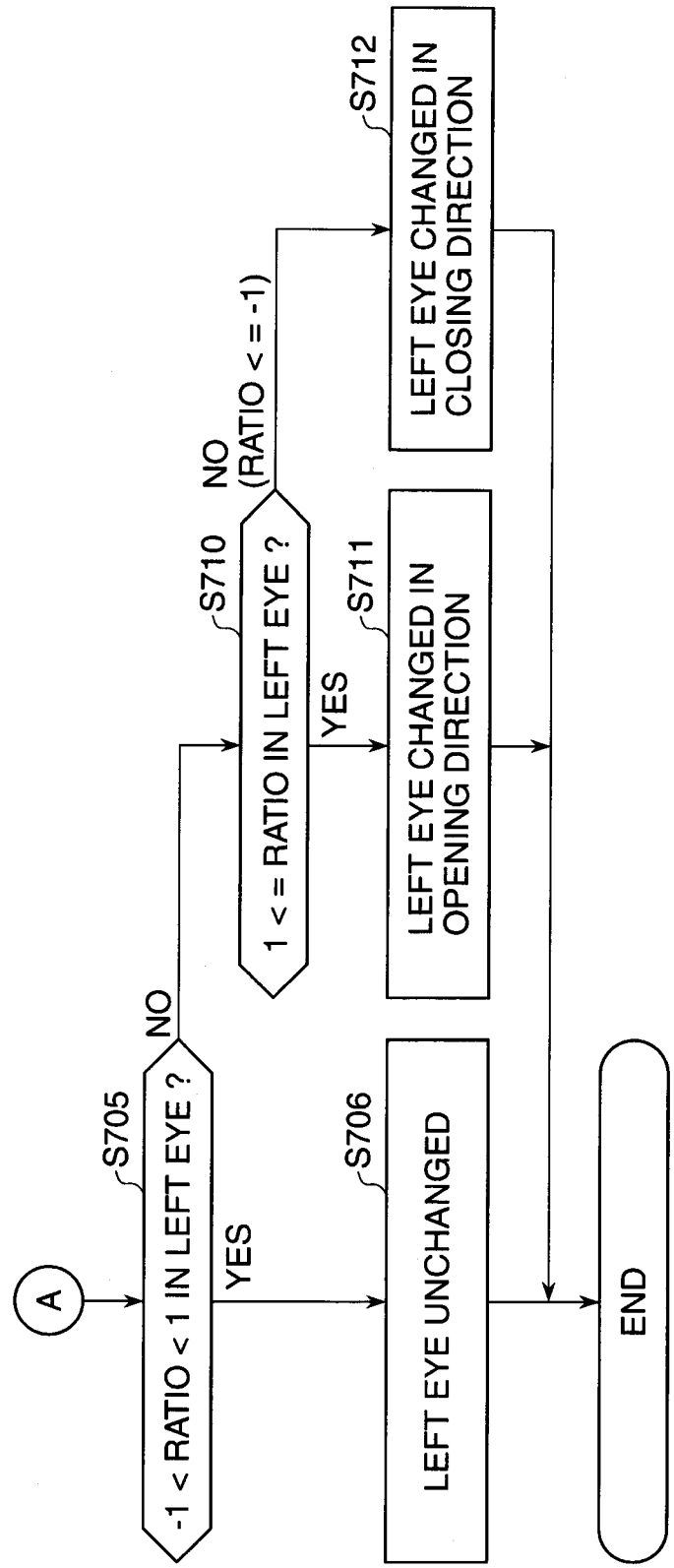

FIGS. 7A and 7B are flowcharts showing the procedure of the eye open change detection process carried out in the step S507 in FIG. 6A.

According to the flowcharts of FIGS. 7A and 7B, the process is sequentially carried out for the right eye and the left eye in this order.

FIGS. 7A and 7B, the system controller 108 calculates a difference in the eye open level of each eye between the present image pickup and the previous image pickup (step S701). The system controller 108 then calculates the ratio between the difference of each eye and the eye open change determination predetermined value (step S702), and determines whether or not the ratio of the right eye is greater than −1 and smaller than 1 (that is, whether or not the absolute value of the ratio is smaller than 1) (step S703). When it is determined that, the absolute value of the ratio of the right, eye is smaller than 1 (YES in the step S703), this means that the right eye is unchanged, and thus the system controller 106 stores in the DRAM 106 that the right eye is unchanged (step S704) and proceeds to step S705.

When it is determined in the step S703 that the absolute value of the ratio of the right eye is not smaller than 1 (NO in the step S703), the system controller 108 determines whether or hot the ratio of the right, eye is equal to or greater than 1 (step S707). When it is determined that the ratio of the right eye is equal to or greater than 1 (YES in the step S707), this means that the right eye has changed in an eye opening direction, and thus the system controller 108 stores in the DRAM 106 that the right eye has changed in an eye opening direction (step S708) and proceeds to the step S705.

When it is determined that the ratio of the right eye is smaller than 1, that is, the ratio of the right eye is not more than −1 (NO in the step S707), this means that the right eye has changed in an eye closing direction, and thus the system controller 108 stores in the DRAM 106 that the right eye has changed in an eye closing direction (step S709) and proceeds to the step S705.

The system controller 108 then determines whether or not the ratio of the left eye is greater than −1 and smaller than 1 (that is, whether or not the absolute value of the ratio is smaller than 1) (step S705). When it is determined that the absolute value of the ratio of the left eye is smaller than 1 (YES in the step S705), this means that the left eye is unchanged, and thus the system controller 108 stores in the DRAM 106 that the left eye is unchanged (step S706) and terminates the present process.

When it is determined in the step S705 that the absolute value of the ratio of the left eye is not smaller than 1 (NO in the step S705), the system controller 108 determines whether or not the ratio of the left, eye is equal to or greater than 1 (step S710). When it is determined that the ratio of the left eye is equal to or greater than 1 (YES in the step S710), this means that the left eye has changed in an eye opening direction. Thus, the system controller 108 stores in the DRAM 106 that the left, eye has changed in an eye opening direction (step S711) and terminates the present process.

When it is determined in the step S710 that the ratio of the left eye is smaller than 1, that is, not more than −1 (NO in the step S710), this means that, the left eye has changed in an eye closing direction. Thus, the system controller 108 stores in the DRAM 106 that the left eye has changed in an eye closing direction (step S712) and terminates the present process.

Figure 8A:
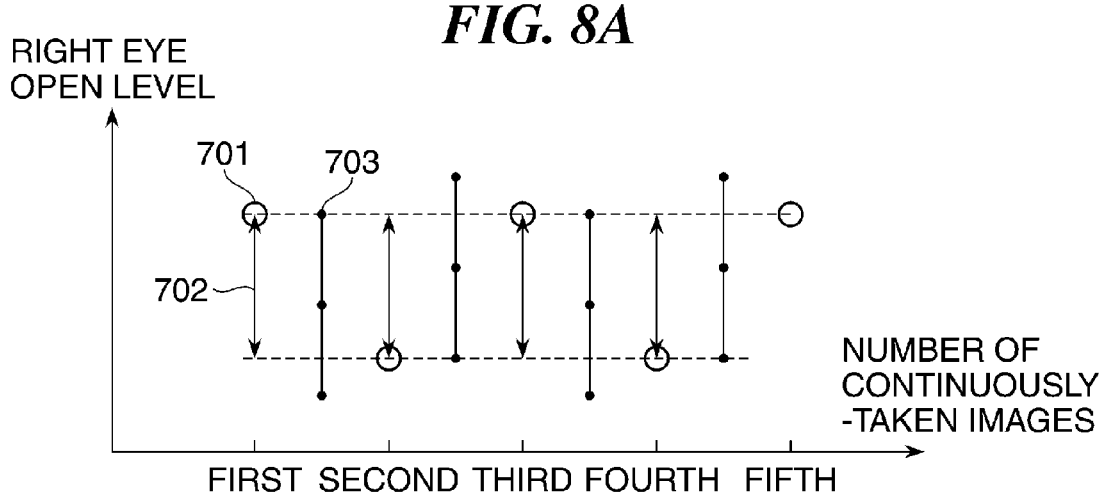
Figure 8B:
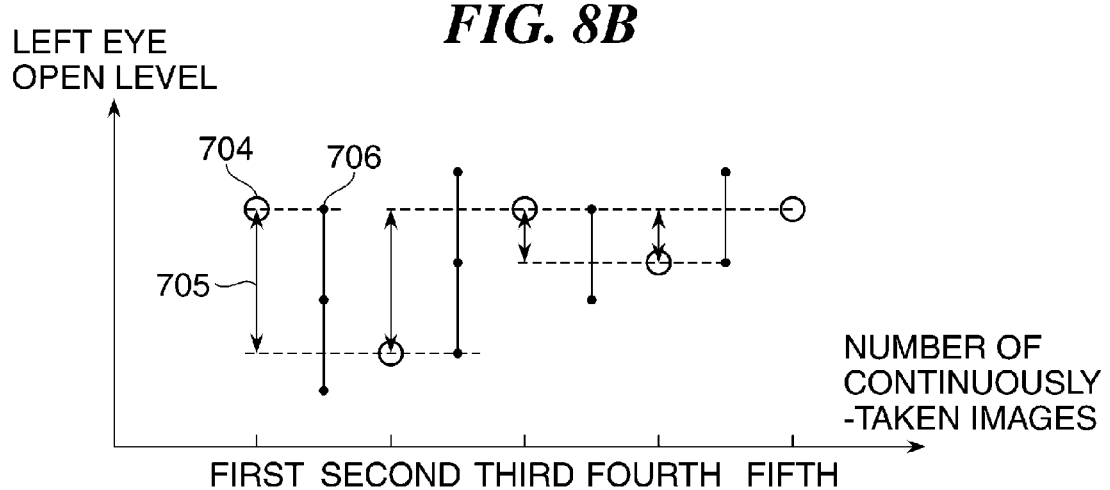
Figure 8C:
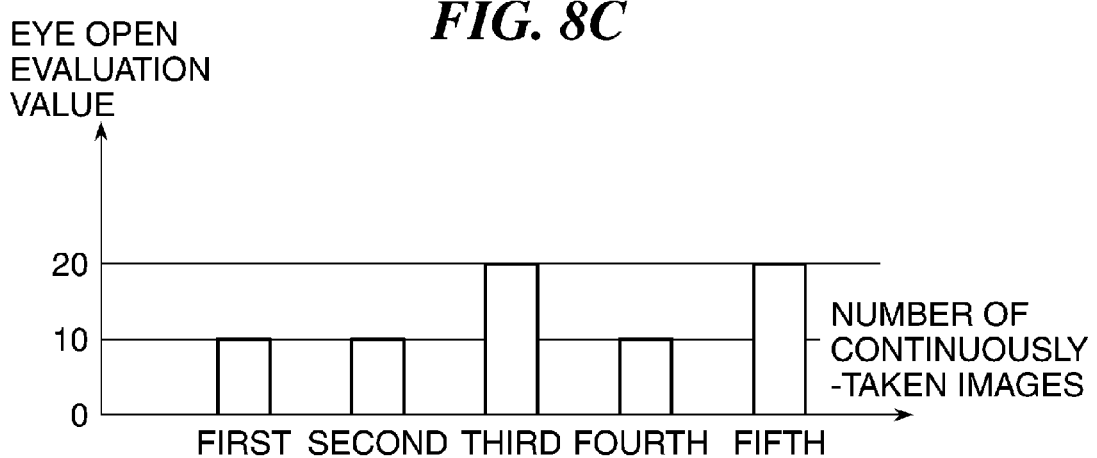

FIGS. 8A to 8C are diagrams useful in explaining an eye open evaluation value assigned in the process in FIGS. 6A and 6B, in which FIG. 8A shows the eye open level of the right eye, FIG. 8B shows the eye open level of the left eye, and FIG. 8C shows eye open evaluation value.

In the graphs of FIGS. 8A and 8B, the vertical axis represents the eye open level of the right or left eye, and the horizontal axis represents the number of images that are continuously taken. In these graphs, white circles 701 and 704 represent eye open levels of the right or left eye in the first, image. Differences 702 and 705 are differences in the smile level of the right or left eye between the first image and the second image. Line segments 703 and 706 are for comparing an eye open determination predetermined value and a difference with each other with respect to the right or left eye, and the eye open determination predetermined value is a segment between the nearest two black circles. The white circles 701 and 704 and the line segments 703 and 706 are used in the same sense with respect to images other than the first one.

Referring to FIG. 8A, an eye open level corresponding to the difference 702 between the first image and the second image is a minus value not less than the eye open determination predetermined value and less than twice the eye open determination predetermined value, and hence the system controller 108 determines that the eye has changed in an eye closing direction. However, when it is determined that there is a smile in the second image, it is not determined whether or not the left eye has changed in an eye closing direction. Referring to FIG. 8A, a description will be given of an eye open evaluation value or the assumption that there is a smile in the second image.

Next, when the second image and the third image are compared in eye open level with each other, a difference between them is a plus value not less than the eye open determination predetermined value and less than twice the eye open determination predetermined value, and the system controller 108 thus determines that the eye has changed in an eye opening direction. Further, when the third image and the fourth image are compared in eye open level with each other, a difference between them is a minus value not less than the eye open determination predetermined value and less than twice the eye open determination predetermined value, and the system controller 108 thus determines that the eye has changed in an eye closing direction.

When the fourth image and the fifth image are compared in eye open level with each other, a difference between them is a plus value not less than the eye open determination predetermined value and less than twice the eye open determination predetermined value, and the system controller 108 thus determines that the eye has changed in an eye opening direction.

Referring to FIG. 8B, an eye open level corresponding to the difference 705 between the first image and the second image is a minus value not less than the eye open determination predetermined value and less than twice the eye open determination predetermined value, and hence the system controller 108 determines that the eye has changed in an eye closing direction. However, when it is determined that there is a smile in the second image, it is not determined whether or not the eye has not changed in an eye closing direction. Referring to FIG. 8B, a description will be given of an eye open evaluation value on the assumption that there is a smile in the second image.

Next, when the second image and the third image are compared in eye open level with each other, a difference between them is a plus value not less than the eye open determination predetermined value and less than twice the eye open determination predetermined value, and the system controller 108 thus determines that the eye has changed in an eye opening direction. Further, when the third image and the fourth image are compared in eye open level with each other, a difference between them is less than the eye open determination predetermined value, and the system controller 108 thus determines that the eye open level is unchanged. In addition, when the fourth image and the fifth image are compared in eye open level with each other, a difference between them is less than the eye open determination predetermined value, and the system controller 108 thus determines that the eye open level is unchanged.

In the graph of FIG. 8C, the vertical axis represents eye open evaluation value, and the horizontal axis represents the number of images that are continuously taken. The eye open evaluation value is calculated based on the state of change in both eyes.

A difference in smile level cannot be calculated for the first image because there is no previous image, and hence the system controller 108 assigns a predetermined evaluation value, for example, "10". In the second image, the right eye has changed in an eye closing direction, and the left eye has changed in an eye closing direction, and thus the system controller 108 determines that the eyes have changed in the same direction, i.e. an eye closing direction. However, when it is determined that there is a smile in the second image, no evaluation value for eye open level is assigned, and thus the evaluation value remains to be "10". In the third image, the right eye has changed in an eye opening direction, and the left, eye has changed in an eye opening direction, and thus the system controller 108 determines that the eyes have changed in the same direction, i.e. an eye opening direction. The ratios of both the right and left eyes are not less than 1 and less than 2, and thus an evaluation value of "+10" is assigned, and the total, evaluation value is "20". In the fourth image, the right eye has changed in an eye closing direction, and the left eye has not changed, and thus the system controller 108 determines that the eyes have changed in an eye closing direction. The ratio of the right eye is not less than 1 and less than 2, and thus an evaluation value of "−10" is assigned, and the total evaluation value is "10". In the fifth image, the right eye has changed in an eye opening direction, and the left, eye has not changed, and thus the system controller 108 determines that the eyes have changed in an eye opening direction. The ratio of the right eye is not less than 1 and less than 2, and thus an evaluation value of "+10" is assigned, and the total evaluation value is "20".

Figure 9:
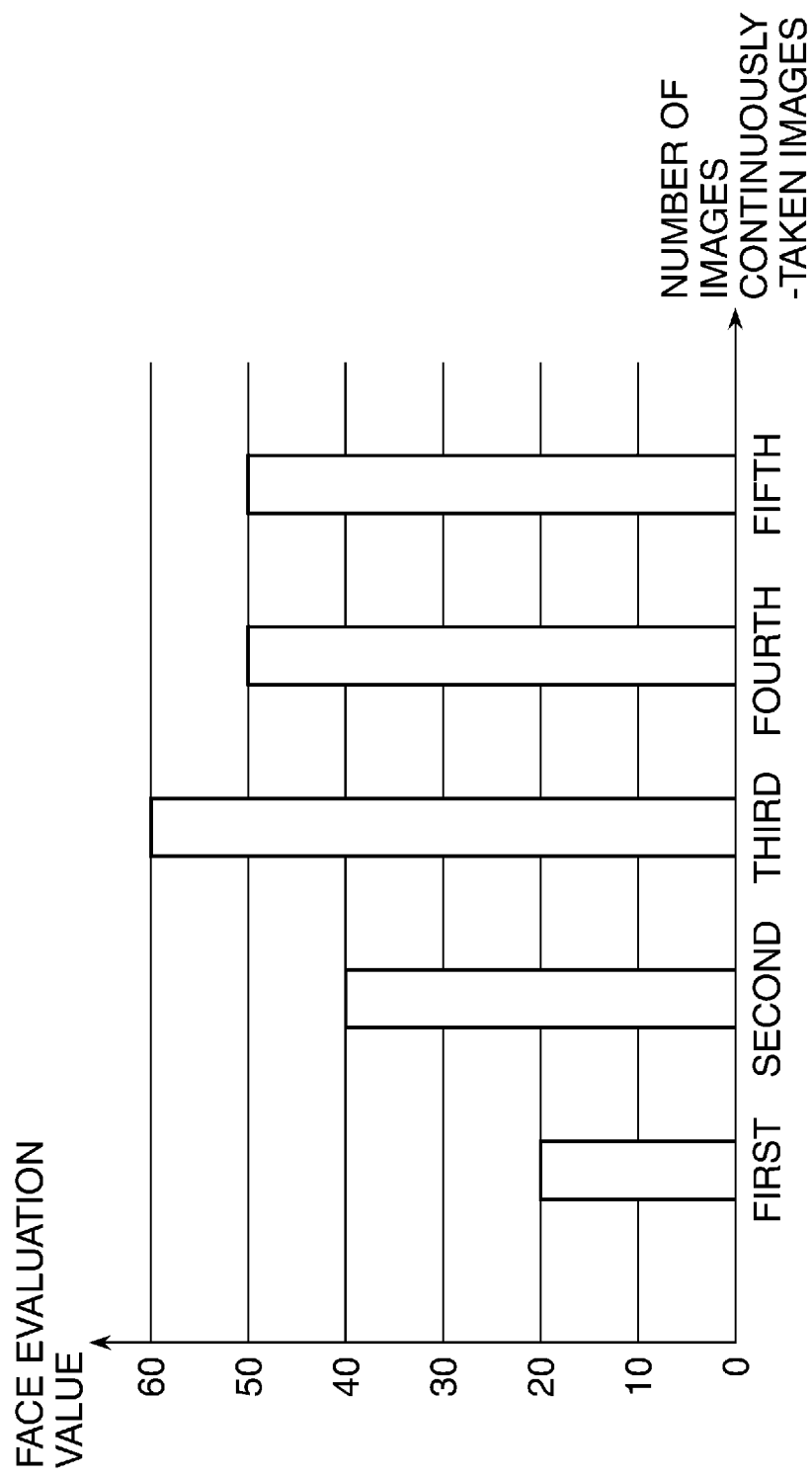
FIG. 9 is a diagram useful in explaining a face evaluation value calculated in the process in FIG. 2.

FIG. 9 is a diagram useful in explaining the face evaluation value calculated in the process in FIG. 2.

In the graph of FIG. 9, the vertical axis represents face evaluation value, and the horizontal axis represents the number of images that are continuously taken. The face evaluation value is the sum of a smile evaluation value and an eye open evaluation value.

The smile evaluation value of the first image is "10", the smile evaluation values of the second and fifth images are "30", and the smile evaluation values of the third and fourth images are "40". On the other hand, the eye open evaluation values of the third and fifth images are "20", and the other eye open evaluation values are "10".

Thus, in the case of smile evaluation values in FIG. 5B and eye open evaluation values in FIG. 8C, the evaluation value of the first image is "20", the evaluation value of the second image is "40", the evaluation value of the third image is "60", the evaluation value of the fourth image is "50", and the evaluation value of the fifth image is "50".

When there is only one evaluation target face, a face evaluation value therefor is an image evaluation value. In the present embodiment, the third image is selected as an image to be recorded due to the conditions that "no minus evaluation values are assigned to all the evaluation target faces. Also, a plus evaluation value is assigned to any of the evaluation target faces. Also, a face evaluation value is the highest".

It should be noted that as described above, when there are a plurality of images that satisfy the above conditions, an image taken first is selected from the plurality of images with consideration given to the timing in which the SW 113 is operated by the user.

Thus, when it is determined that the degree of change in the smile level or eye open level of an evaluation target face is smaller than a threshold value, the resulting evaluation value is the same value as the previous evaluation value. Thus, when there is only a small change in facial expression, image data can be selected with the timing of operation of the SW 113 by the user given higher priority than the level of the facial expression. As a result, an image can be selected with consideration given to both the evaluation value of the facial expression and the timing of the operation of the SW 113 by the user, and image data more suited to the user can be stored from images that have been continuously taken.

Although in the present embodiment, face-related degrees are the levels of smile and eye open, evaluation values may be similarly assigned to the composition and focusing of an image depending on the position and size of a face and used for the selection of an image.

In the present embodiment, when there are a plurality of images with the highest evaluation value, an image taken first is selected (YES in the step S203). Thus, an image close to the time at which image pickup is started is selected, and hence an image more suited to the user can be selected.

In the embodiment described above, control of the system controller 103 may be exercised by a single piece of hardware, or shared by a plurality of pieces of hardware so as to control the entire apparatus.

Moreover, although in the embodiment described above, the present, invention is applied to the digital camera 100, the present invention is not limited to this. Specifically, the present invention may be applied to any display control apparatus insofar as it can provide control so that so that, a plurality of images can be displayed at the same time. Examples of the display control apparatus include a personal computer and a PDA. Moreover, a cellular phone terminal, a portable image viewer, a display provided in a printer unit which allows selection and confirmation of an image to be printed, and a digital photo-frame.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183297 filed Aug. 18, 2010, which is hereby incorporated by reference herein in its entirety.

What is claimed is:

1. An image pickup apparatus that continuously shoots to generate a plurality of image data, comprising:
 a calculation unit configured to calculate, for each of the plurality of image data, an evaluation value based on a subject included in the each of the plurality of image data;
 a selection unit configured to select any image data from among the plurality of image data based on the evaluation value in the each of the plurality of image data and the order of the plurality of image data generated by shooting; and
 a storage unit configured to store the image data selected by the selection unit,
 wherein the selection unit is configured to select an image data with the highest evaluation value from among the plurality of image data, and
 wherein the selection unit selects, in a case where a difference between an evaluation value in an image data generated by a first shooting and an evaluation value in an image data generated by a later shooting is a predetermined value or less, the image data generated by the first shooting from among the plurality of the image data even if the evaluation value in the image data generated by the later shooting is higher than the evaluation value in the image data generated by the first shooting.

2. An image pickup apparatus according to claim 1, wherein the selection unit selects the image generated by the later shooting in a case where the evaluation value in the image data generated by the later shooting is higher than the evaluation value in the image data generated by the first shooting and the difference between the evaluation value in the image data generated by the first shooting and the evaluation value in the image data generated by the later shooting is higher than the predetermined value.

3. An image pickup apparatus according to claim 1, further comprises a second selection unit configured to select, from the each of the plurality of image data, a subject based on which the calculation unit calculates an evaluation value,
 wherein the calculation unit calculates, for the each of the plurality of image data, an evaluation value based on the subject selected by the second selection unit.

4. An image pickup apparatus according to claim 1, wherein the calculation unit calculates a smile evaluation value for a smile of a person included in the each of the plurality of image data.

5. An image pickup apparatus according to claim 1, wherein the calculation unit calculates an eye open evaluation value for eyes of a person included in the each of the plurality of image data.

6. A control method for an image pickup apparatus that continuously shoots to generate a plurality of image data, comprising:
 calculating, for each of the plurality of image data, an evaluation value based on a subject included in the each of the plurality of image data;
 selecting any image data from among the plurality of image data based on the evaluation value in the each of the plurality of image data and the order of the plurality of image data generated by shooting; and
 storing the selected image data into a storage medium,
 wherein selecting any image data comprises selecting an image data with the highest evaluation value from among the plurality of image data, and
 wherein selecting any image data further comprises selecting, in a case where a difference between an evaluation value in an image data generated by a first shooting and an evaluation value in an image data generated by a later shooting is a predetermined value or less, the image data generated by the first shooting from among the plurality of the image data even if the evaluation value in the image data generated by the later shooting is higher than the evaluation value in the image data generated by the first shooting.

7. A non-transitory computer-readable storage medium storing a program for causing a computer to implement a control method for an image pickup apparatus that continuously shoots to generate a plurality of image data, the control method comprising:
 calculating, for each of the plurality of image data, an evaluation value based on a subject included in the each of the plurality of image data;
 selecting any image data from among the plurality of image data based on the evaluation value in the each of the plurality of image data and the order of the plurality of image data generated by shooting; and
 storing the selected image data into a storage medium,
 wherein selecting any image data comprises selecting an image data with the highest evaluation value from among the plurality of image data, and
 wherein selecting any image data further comprises selecting, in a case where a difference between an evaluation value in an image data generated by a first shooting and an evaluation value in an image data generated by a later shooting is a predetermined value or less, the image data generated by the first shooting from among the plurality of the image data even if the evaluation value in the image data generated by the later shooting is higher than the evaluation value in the image data generated by the first shooting.

8. An image pickup apparatus comprising:
 an image pickup unit configured to continuously shoot in accordance with an instruction of a user;

a calculation unit configured to calculate, for each of a plurality of images obtained by the continuous shooting, an evaluation value based on a subject included in the each of the plurality of images;

a selection unit configured to select any image from among the plurality of images based on the evaluation value of the each of the plurality of images and an interval between a timing of a shooting of the each of the plurality of images and a timing of the instruction of the user; and a storage unit configured to store the image selected by the selection unit, wherein the selection unit is configured to select an image data with the highest evaluation value from among a plurality of image data, the plurality of image data including a first image data and a second image data, and wherein the selection unit, in a case where a difference between an evaluation value in the first image data and an evaluation value in the second image data is a predetermined value or less and a timing of a shooting which has generated the first image data is closer to a timing of the instruction of the user than a timing of a shooting which has generated the second image data, selects the first image data even if the evaluation value in the second image data is higher than the evaluation value in the first image data.

9. An image pickup apparatus according to claim 8, wherein the selection unit selects the second image data in a case where the evaluation value in the second image data is higher than the evaluation value in the first image data and the difference between the evaluation value in the first image data and the evaluation value in the second image data is higher than the predetermined value.

10. An image pickup apparatus according to claim 8, further comprises a second selection unit configured to select, from the each of the plurality of image data, a subject based on which the calculation unit calculates an evaluation value, wherein the calculation unit calculates, for the each of the plurality of image data, an evaluation value based on the subject selected by the second selection unit.

11. An image pickup apparatus according to claim 8, wherein the calculation unit calculates a smile evaluation value for a smile of a person included in the each of the plurality of image data.

12. An image pickup apparatus according to claim 8, wherein the calculation unit calculates an eye open evaluation value for eyes of a person included in the each of the plurality of image data.

13. A control method for an image pickup apparatus, comprising:

continuously shooting in accordance with an instruction of a user;

calculating, for each of a plurality of images obtained by the continuous shooting, an evaluation value based on a subject included in the each of the plurality of images;

selecting any image from among the plurality of images based on the evaluation value of the each of the plurality of images and an interval between a timing of a shooting of the each of the plurality of images and a timing of the instruction of the user; and storing the selected image into a storage medium, wherein the selecting includes selecting an image data with the highest evaluation value from among a plurality of image data, the plurality of image data including a first image data and a second image data, and wherein, in a case where a difference between an evaluation value in the first image data and an evaluation value in the second image data is a predetermined value or less and a timing of a shooting which has generated the first image data is closer to a timing of the instruction of the user than a timing of a shooting which has generated the second image data, the first image data is selected even if the evaluation value in the second image data is higher than the evaluation value in the first image data.

14. A non-transitory computer-readable storage medium storing a program for causing a computer to implement a control method for an image pickup apparatus, the control method comprising:

continuously shooting in accordance with an instruction of a user;

calculating, for each of a plurality of images obtained by the continuous shooting, an evaluation value based on a subject included in the each of the plurality of images;

selecting any image from among the plurality of images based on the evaluation value of the each of the plurality of images and an interval between a timing of a shooting of the each of the plurality of images and a timing of the instruction of the user; and storing the selected image into a storage medium, wherein the selecting includes selecting an image data with the highest evaluation value from among a plurality of image data, the plurality of image data including a first image data and a second image data, and wherein, in a case where a difference between an evaluation value in the first image data and an evaluation value in the second image data is a predetermined value or less and a timing of a shooting which has generated the first image data is closer to a timing of the instruction of the user than a timing of a shooting which has generated the second image data, the first image data is selected even if the evaluation value in the second image data is higher than the evaluation value in the first image data.

* * * * *